United States Patent Office 3,496,785
Patented Feb. 24, 1970

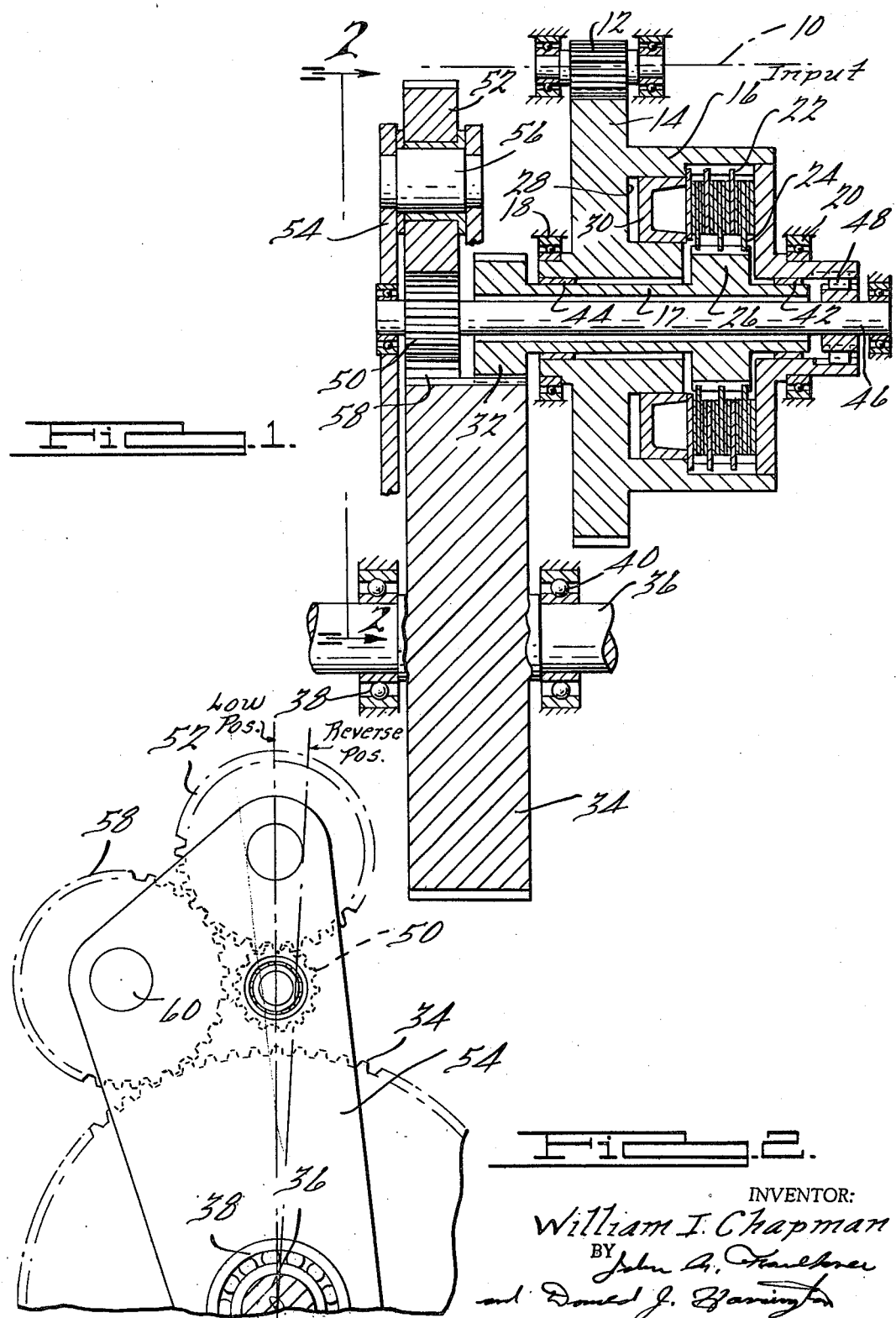

3,496,785
MULTIPLE SPEED RATIO POWER TRANSMISSION MECHANISM FOR GAS TURBINE ENGINE DRIVELINES
William I. Chapman, Birmingham, Mich., assignor to Ford Motor Company, Dearborn, Mich., a corporation of Delaware
Filed May 20, 1968, Ser. No. 730,469
Int. Cl. F16h *3/08, 57/00*
U.S. Cl. 74—354                                6 Claims

ABSTRACT OF THE DISCLOSURE

This specification discloses a driveline including gearing adapted to connect drivably the turbine shaft of a gas turbine engine with an output shaft whereby multiple torque delivery paths are established with a relatively high speed reduction ratio. The same gearing elements used for forward drive operation, including a drive pinion and a reducing idler, can be used for reverse drive operation by shifting a carrier for the gear elements in a plane that is transverse to the axis of the turbine shaft.

Brief summary of the invention

My invention relates generally to torque delivery drivelines for gas turbine power plants whereby the turbine torque can be delivered to an output shaft with a moderate driven speed. The gearing elements of the driveline are capable of establishing a speed reduction of approxiamtely 30–1 to 70–1. Two forward driving speed ratios are available as well as a single reverse ratio.

Ratio changes in the forward drive mode are achieved by engaging and disengaging selectively a friction disc clutch. No other engagement or disengagement of a friction torque establishing device is required since there are no clutch and brake timing problems normally associated with multiple ratio drives. Furthermore, the gearing is capable of establishing a continuous driving connection between the turbine shaft and the output shaft during operation in the forward drive mode, thereby preventing undesirable transient disconnections between the turbine shaft and the load. Overspeeding of the turbine thus is avoided during ratio changes.

Reverse drive is achieved by employing a reverse pinion and idlers that are carried by a common carrier mounted for oscillation about the axis of the output shaft. The carrier can be moved in one direction to effect driving engagement of the idlers and pinion for torque delivery in one direction. The carrier can be oscillated in the opposite direction to disestablish the forward drive torque delivery path and to establish instead a reverse torque delivery path. As the carrier oscillates from one position to the other, provision may be made for braking momentarily the turbine shaft to prevent engine runaway.

Brief description of the figures of the drawings

FIGURE 1 shows in longitudinal, cross-sectional form a schematic representation of the gearing elements of my improved drive.

FIGURE 2 is an end view of the structure of FIGURE 1 as seen from the plane of section line 2—2 of FIGURE 1.

Particular description of the invention

In FIGURE 1 the turbine shaft, which is the power input shaft in this embodiment, is represented by reference character 10. Drivably coupled to the shaft 10 is a power input pinion 12, which may be a helical pinion. Pinion 12 engages a helical gear 14. This gear forms a part of a clutch drum 16 which is journaled at its left-hand side by bearing 18 on a stationary housing portion. It is journaled at its right-hand side by bearing 20.

Clutch drum 16 carries on its splined inner periphery externally splined clutch discs 22. These are situated in interdigital relationship with respect to internally splined clutch discs 24 carried by an externally splined clutch element 26.

Drum 16 defines an annular cylinder 28 within which is positioned an annular piston 30. Cylinder 28 defines in part a pressure chamber to which pressure can be admitted to cause engagement of the friction discs.

Clutch element 26 is connected to clutch sleeve shaft 17. On the left-hand side of sleeve shaft 17 is mounted in driving relationship therewith a drive pinion 32. This meshes drivably with power output gear 34, which is connected drivably to power output shaft 36.

Output shaft 36 is situated for rotation about an axis that is parallel to the axis of the input shaft 10. It is mounted in any suitable fashion by bearings 38 and 40 in the transmission housing structure. The sleeve shaft 17 is journaled at its right-hand end by bushing 42 within the drum 16. It is journaled at its left-hand end by bushing 44. Drum 16 is drivably connected to a central torque delivery shaft 46 by means of an overrunning clutch 48. A one-way torque delivery path between the clutch drum and the shaft 46 is established by the clutch 48, but freewheeling motion in the opposite direction is permitted.

Shaft 46 is connected at its left-hand end to drive pinion 50. This meshes drivably with idler 52 during forward drive operation.

Idler 52 is journaled rotatably on a carrier 54 which includes an idler shaft 56. The carrier 54 is best seen in FIGURE 2. Mounted also on the carrier 54 is another idler 58 which is adapted to mesh drivably with the idler 52. It also is journaled rotatably on the carrier 54 by means of a shaft 60.

The radially inward end of the carrier 54 is journaled for oscillation about the axis of the shaft 36.

This gearing arrangement is capable of providing two forward driving speed ratios and a single reverse speed ratio. Ratio changes under torque can be achieved in the forward driving mode by engaging and disengaging the multiple disc clutch shown in part at 22 and 24 without torque interruption. The overall speed reduction may be as high as 70:1 in the low speed operating mode and about 30:1 in the high speed operating mode.

During operation in the low speed ratio, forward drive mode the gear 12 acts as a power input gear as it drives gear 14 on the clutch drum 16. The multiple disc clutch is disengaged. Torque is distributed then from the clutch drum 16 and through the one-way clutch 48 to the shaft 46. The driving torque then drives the pinion 50. When the carrier 54 is positioned as shown in FIGURE 2, pinion 50 drives idler 52 which in turn drives idler 58. Idler 58 is in engagement with output gear 34. Thus, the output gear is driven in the same direction of rotation as the shaft 46 with a high speed reduction.

To effect a ratio transition to the high speed, forward driving mode, the clutch is engaged. This then causes a direct connection between the drum 16 and the idler 32. The overrunning clutch 48 freewheels after the clutch is engaged and its torque transmitting capacity is sufficient to accommodate the driving torque. The carrier 54 remains in the position shown.

When the vehicle is stationary the carrier 54 is shifted from the position shown in FIGURE 2 to a driving position in the clockwise direction. Idler 52 then becomes disengaged from the idler 50. The disc clutch is disengaged at the same time idler 58 becomes drivably engaged with idler 50. The output gear, which continues to mesh with the idler 58, now is driven in a reverse direction with respect to the direction of rotation of the shaft 46.

If overspeeding of the input shaft 10 is to be avoided during a shift to the reverse drive ratio, a suitable brake for shaft 36 can be provided. After the reverse drive is completed, the brake can be released. The one-way clutch 48 will freewheel during operation in reverse thereby allowing idler 52 to freewheel.

Having thus described a preferred form of my invention, what I claim and desire to secure by U.S. Letters Patent is:

1. A geared torque delivery mechanism for delivering driving torque from a power input shaft to a power output shaft comprising a driving pinion connected to said power input shaft, a drive gear engaging said driving pinion, means for rotatably journaling said drive gear for rotation on a relatively stationary portion of said mechanism, a torque delivery shaft extending concentrically with respect to said drive gear, an overrunning clutch connection between said torque delivery shaft and said drive gear whereby torque is delivered to said torque delivery shaft in one direction and freewheeling motion between said drive gear and said torque delivery shaft in the other direction is permitted, a second pinion connected to said torque delivery shaft, a third pinion, a sleeve shaft surrounding said torque delivery shaft and connected directly to said third pinion, selectively engageable friction clutch means for connecting and disconnecting said drive gear and said sleeve shaft, a pair of idlers, a carrier journaling both of said idlers for movement in unison, said idlers being engaged with each other and rotatable about their respective axes, said carrier being journaled for oscillation about the axis of said output shaft, a power output gear connected to said output shaft situated in continuous meshing engagement with said third pinion, one of said idlers being engageable continuously with said output gear, the other idler engaging drivably said second pinion when the carrier assumes one driving position, said one idler drivably engaging said second pinion when said carrier assumes another driving position.

2. The combination set forth in claim 1 wherein said second pinion is disengaged from said one idler and engaged with the other idler when said carrier assumes one position, said second pinion disengaging said one idler and engaging said other idler when said carrier assumes a second driving position.

3. The combination set forth in claim 1 wherein said output shaft and said input shaft are situated in spaced, parallel disposition, said torque delivery shaft extending through said sleeve shaft with said second and third pinions situated on one side of said drive gear and said clutch situated on the other side thereof.

4. The combination set forth in claim 2 wherein said output shaft and said input shaft are situated in spaced, parallel disposition, said torque delivery shaft extending through said sleeve shaft with said second and third pinions situated on one side of said drive gear and said clutch situated on the other side thereof.

5. A geared torque delivery mechanism for delivering driving torque from a driving member to a power output shaft comprising a torque delivery shaft, means for connecting and disconnecting said driving member and said torque delivery shaft, a first pinion connected to said torque delivery shaft, a second pinion, clutch means for connecting and disconnecting said driving member and said second pinion, a pair of idlers, a carrier journaling both of said idlers for movement in unison, said idlers being engaged with each other and rotatable about their respective axes, said carrier being journaled for oscillation about the axis of said output shaft, and a power output gear connected to said output shaft and situated in meshing engagement with said second pinion, one of said idlers being engageable with said output gear, the other idler engaging drivably said first pinion when the carrier assumes one driving position, said one idler drivably engaging said first pinion when said carrier assumes another driving position.

6. The combination as set forth in claim 5 wherein said connecting and disconnecting means is a one-way clutch that accommodates torque delivery to said driving member in one direction but which permits freewheeling in the opposite direction.

References Cited

UNITED STATES PATENTS

| | | | |
|---|---|---|---|
| 1,380,874 | 4/1921 | Valent | 74—354 |
| 2,126,547 | 8/1938 | Fottinger | 74—354 |
| 2,136,811 | 11/1938 | Burnett | 192—48.92 |
| 2,260,581 | 10/1941 | Pollard | 74—330 |
| 3,251,442 | 5/1966 | Aschauer | 192—48.92 |

WILLIAM L. FREEH, Primary Examiner

U.S. Cl. X.R.

74—360, 404